April 7, 1959     G. A. LYON     2,881,026
WHEEL COVER
Filed May 3, 1955
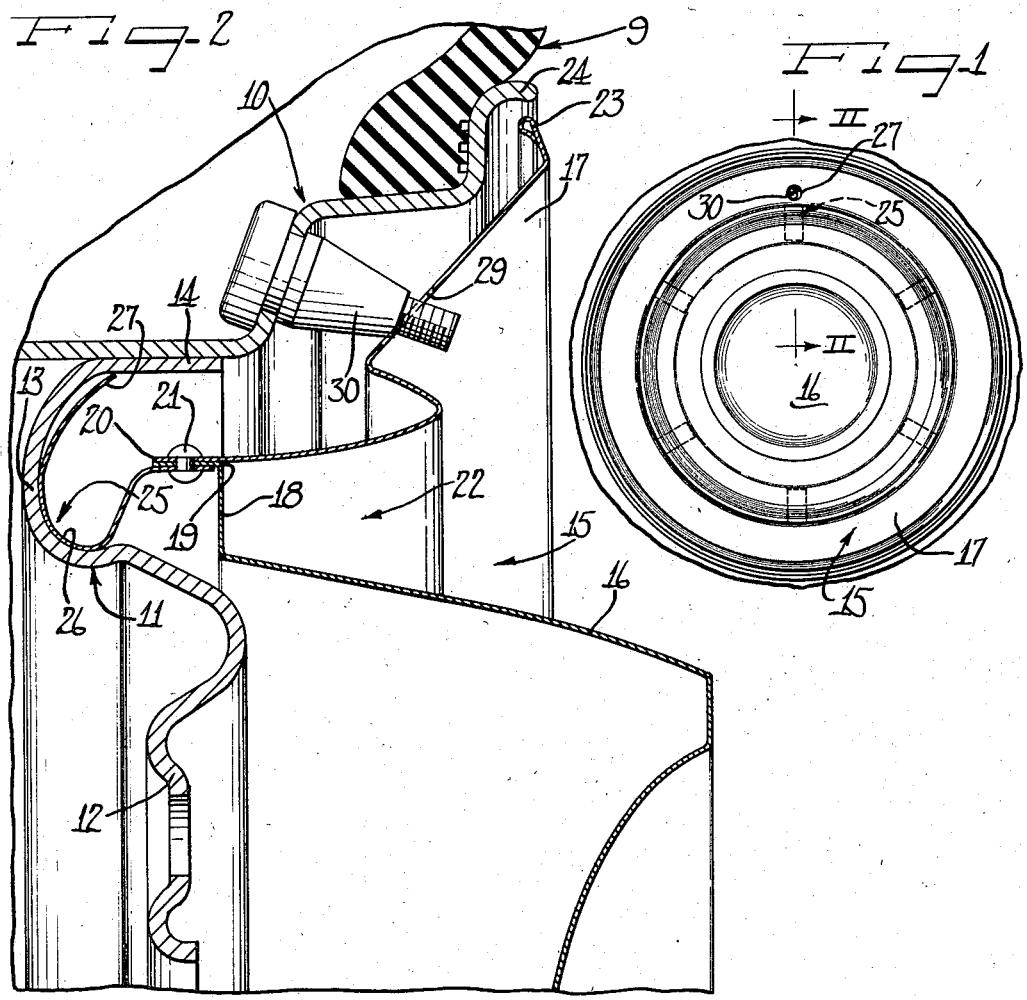
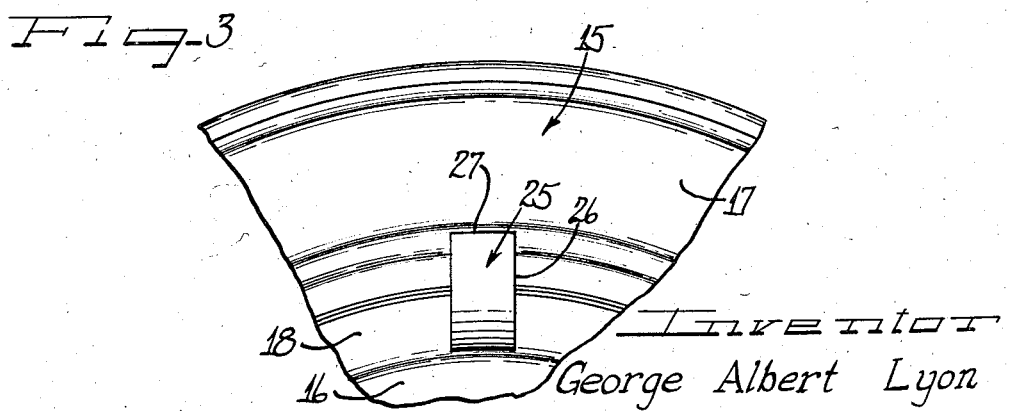
George Albert Lyon

United States Patent Office 2,881,026
Patented Apr. 7, 1959

2,881,026

WHEEL COVER

George Albert Lyon, Detroit, Mich.

Application May 3, 1955, Serial No. 505,675

14 Claims. (Cl. 301—37)

This invention relates to automobile wheel covers and more particularly to a multi-piece cover with improved retaining means.

In the race of automobile manufacturers to outdo each other in the provision of outstanding and highly ornamental designs for the automobile, more and more emphasis is being placed on the wheel. In fact the present trend is to employ wheel covers which have exceptionally deep draws so as to give a highly ornamental and different look to the wheel.

By virtue of this tendency of automobile manufacturers to employ wheel covers with deep draws the problem of properly retaining such a wheel cover becomes more acute. Constantly existing types of retaining means have been found to be inadequate when resort is made to a new design of cover.

It is an aim of this invention to provide an improved wheel cover which lends itself to economical manufacture on a large production basis and which affords an entirely different ornamental look to the wheel.

Still another object of this invention is to provide a wheel cover with improved means which will properly hold the cover on the wheel notwithstanding the depth of draw of the component portions of the cover.

Yet another object of this invention is to provide a cover wherein the retaining means may be economically secured to the cover at the junction of two components of the cover and wherein the retaining means also serves to center the cover on the wheel.

In accordance with the general features of this invention there is provided in a wheel structure including a wheel having a tire rim part and a body part with a depression adjacent the junction of the parts, a wheel cover comprising an outer annular portion and a central portion, the portions having relatively deep confronting axially extending sections connected together opposite the wheel depression and circumferentially spaced resilient retaining portions connected to the cover at the junction of the cover sections, each of the retaining portions being generally of a goose neck construction to nest tightly in and transversely of the depression and each having an extremity in gripping engagement with one of the wheel parts.

Still another feature of the cover relates to the fastening of the retaining means to the confronting radially outer and inner portions of the cover at the junction of such portions so as to simplify the assembly of the cover and maintain at a minimum the expense of manufacture.

Other objects and features of this invention will more fully appear from the following detailed description taken in connection with the accompanying drawings which illustrate a single embodiment thereof and in which:

Figure 1 is a fragmentary side view of a wheel embodying the cover with the features of this invention;

Figure 2 is an enlarged fragmentary cross sectional view taken on substantially line II—II of Figure 1 looking in a direction indicated by the arrows; and Figure 3 is a fragmentary detailed view looking at a back portion of the cover in the area of one of the retaining elements or clips.

As shown on the drawings:

The reference character 9 designates generally a pneumatic tire assembly mounted in the customary way upon a multi-flange drop center type of tire rim 10. This tire rim 10 is of a conventional construction and is carried in the ordinary way upon a central body part or spider 11. The spider as is customary has a central bolt on flange 12 by means of which the wheel may be detachably fastened to a part on the axle of the automobile.

As is known, the tire rim 10 comprises a rolled metallic part whereas the spider or body part 11 comprises a metallic stamping which is suitably secured to the face of the rim part at 14.

The body part in keeping with the features of this invention is provided with an annular depression 13 adjacent the junction of the body and rim parts 10 and 11.

Cooperable with this conventional wheel assembly, with the exception of the depression 13, is a wheel cover designated generally by the reference character 15. This wheel cover may be made from any suitable metallic sheet material although excellent results may be attained by making it from stainless sheet by virtue of the fact that such material lends itself to highly desirable finishes.

The cover 15 includes two cooperating parts or portions 16 and 17 although it is to be understood that the cover could be made of one piece if it is so desired. It will be appreciated that in view of the depth of draw involved in the two parts or portions of the covers it is more economical to manufacture the cover from two pieces than from one.

The two parts, portions or sections 16 and 17 of the cover 15 comprise a central crown or hub cap portion 16, which will be noted, is of an exceptionally deep axial depth. The other or outer annular portion 17 is also of great depth and confronts portion 16.

While the central portion 16 overlies the body part 11 of the wheel, the outer annular portion 17 on the other hand extends over the junction of the wheel parts and substantially over the exposed side flanges of the tire rim part 10.

By virtue of the portions 16 and 17 being made separately, they may be given any desirable configuration consistent with a particular appearance required by a given manufacturer.

The central cover portion 16 has a radially offset portion 18 terminating in an axially extending rib portion 19 which projects into the interior of the wheel opposite the depression 13. This terminal portion 19 of the central part of the cover is secured to the terminal portion 20 of the outer annular cover part by any suitable means such for example as welding or rivets 21. It will be perceived that the junction of the inner and outer portions 16 and 17 of the cover is directly opposite the depression 13 in the wheel for a purpose that will become more apparent hereinafter.

By virtue of the use of the offset portion 18 on the central cover part 16, there is provided a relatively deep annular depression or draw 22 between the confronting portions 16 and 17. This enables a highly desirable contrasting appearance to be effected as between the portions 16 and 17. For illustration, the central portion 16 could be given one type of finish and the outer annular portion 17 could be given a different or lustrous finish. Then too, by virtue of the portions being opposite to each other, light is radiated from one to the other giving very pleasing and ornamental highlights to the cover.

The outer edge of the cover portion 17 may be beaded or turned at 23 so as to reinforce the edge of the cover to provide it with a pry-off edge. In addition, this edge 23 serves to prevent one from cutting his hands in the handling of the cover. I find it desirable to dispose the beaded edge 23 close to the terminal flange 24 but out of contact therewith.

Now referring to the retaining means for the cover 15, it is the intention of this invention to make use of the junction of the two portions 16 and 17 as an area for the attachment of the retaining means for the cover. In this instance, the two fastened portions 19 and 21 also have secured to them a plurality of circumferentially spaced resilient retaining elements or clips 25. These clips as shown in Figure 1 may be of any suitable number but are illustrated here as being six in number. Actually, the same retaining means, such for example as the rivets 21, are employed, for simplicity purposes, and to secure the cover retaining clips 25 to the cover 15.

Each of these clips has one end secured to the junction of the cover portions 16 and 17 and has its free end formed into a goose neck or loop configuration 26. This configuration is predetermined so as to enable the clip to be compressed to transversely and snugly nest in the curved concaved depression 13 between the radially spaced side wall areas defining the depression 13 on the dished body part 11. Also each clip has a biting or gripping generally radially extending extremity or edge 27 adapted when the cover is on the wheel to resiliently engage the body part at the junction 14 of the rim and body parts. This engagement is such that any tendency to displace accidentally the cover 15 from the wheel will augment the biting grip of the clip terminals 27 on the wheel. However, the bite is not sufficiently great to preclude the ready pry-off of the cover when it is desired to have access to the central wheel bolts (not shown).

In effecting a removal of the cover, a suitable pry-off tool such as a screw driver is inserted under the edge 23 and upon the twisting of the same, the cover may be quickly ejected from the wheel.

In order to facilitate the alignment of the cover with the wheel, the outer annular portion 17 is provided with a valve stem aperture 29 to which the free end of the valve stem 30 is adapted to project when the cover is on the wheel. The valve stem is of a conventional construction and is attached in the usual way to the rim 10 of the wheel. It will be appreciated that in the instant showing, I have shown a tubeless tire although the invention is equally well applicable to different wheel and tire assemblies.

In the application of the cover, the hole 29 is aligned with the valve stem 30 and then the cover is manually pressed axially into the body of the wheel until it is bottomed against the wheel body part 11. In pressing the cover home on the wheel, the spring clip terminals 27 ride along the junction 14 of the wheel until the goose neck portions of the clips are bottomed and nested in the depression 13. Thus, the spring clips not only serve to retain the cover on the wheel but in addition they serve to center the cover and to bottom the cover on the wheel. In other words, in this particular application of the invention, the cover does not bottom on the wheel except at its points of retention. However, if it is so desired within the spirit of this invention, the cover could bottom elsewhere although I found it preferable to use a floating type of cover and to employ the spring clips as the bottoming means.

It will be understood that modifications and variations may be effected without departing from the spirit and scope of the novel concepts of the present invention.

I claim as my invention:

1. In a wheel structure including a wheel having a tire rim part and a body part with a depression adjacent the junction of the parts, a wheel cover comprising an outer annular portion and a central portion, said portions having confronting axially extending sections connected together opposite said wheel depression and circumferentially spaced resilient retaining portions connected to said cover at the junction of said cover sections, each of said retaining portions being generally of a goose neck construction to nest tightly in and transversely of said depression and each having an extremity in gripping engagement with one of said wheel parts.

2. In a wheel structure including a wheel having a tire rim part and a body part with a depression adjacent the junction of the parts; a wheel cover including an outer annular portion and a central portion with said portions merging into a junction generally opposite said wheel depression; and circumferentially spaced resilient retaining portions connected to said cover in proximity to the junction of said cover portions, each of said retaining portions being of a resilient looped construction to nest tightly in said depression in cushioned relation to the wheel.

3. In a wheel structure including a wheel having a tire rim part and a body part with a depression adjacent the junction of the parts; a wheel cover including an outer annular portion and a central portion with said portions merging into a junction generally opposite said wheel depression; and circumferentially spaced retaining portions connected to said cover in proximity to the junction of said cover portions, each of said retaining portions being of a resilient construction conforming generally to the dimension of the depression to nest therein and having an edge biasable against one of said parts to augment the gripping action of the retaining portions.

4. In a wheel structure including a wheel having a tire rim part and a body part which parts are joined together and with an annular depression adjacent the junction of the parts; a wheel cover including an outer annular portion and a central portion with said portions merging into a junction generally opposite said wheel depression; and spring finger means disposed on the axially inner side of said cover portions at the junction of the cover portions and compressed in the annular depression between its side walls in removable assembly therewith.

5. In a wheel structure including a wheel having a tire rim part and a body part with a depression adjacent the junction of the parts; a wheel cover including an outer annular portion and a central portion with said portions merging into a junction generally opposite said wheel depression; and spring finger means secured with said cover portions at the junction of the cover portions and extending generally axially rearwardly into snap-on snap-off engagement with the wheel, said spring finger means comprising a plurality of generally axially extending resilient fingers having a terminal edge for engagement with the wall of the depression.

6. In a wheel structure including a wheel having a tire rim part and a body part with a depression adjacent the junction of the parts; a wheel cover including an outer annular portion and a central portion with said portions merging into a junction generally opposite said wheel depression; and circumferentially spaced resilient retaining portions connected at one end to said cover in proximity to the junction of said cover portions, and a looped portion on the other end thereof nestingly engageable in the depression and terminating in a generally radially extending edge for biasing the looped portion into and out of engagement with the depression upon the application of an appropriate force.

7. In a wheel structure including a wheel having a tire rim part and a body part with a depression adjacent the junction of the parts; a wheel cover including an outer annular section and a crown section with said sections merging into and being secured together at a junction generally opposite said wheel depression; and circumferentially spaced resilient retaining portions connected to said cover and conforming generally to the dimension of the depression to nest therein and having an edge biasable against one of said parts to augment the gripping action of the retaining portion.

8. In a wheel structure including a wheel having a tire rim part and a body part with a depression adjacent the junction of the parts; a wheel cover including an outer annular section and a crown section with said sections merging into and being secured together at a junction generally opposite said wheel depression; and circumferentially spaced resilient retaining portions connected to said cover and conforming generally to the dimension of the depression to nest therein and having an edge biasable against one of said parts to augment the gripping action of the retaining portion, said sections being secured together at circumferentially spaced intervals by the same retaining means which also connects the circumferentially spaced retaining portions to the cover.

9. In a wheel structure including a wheel having a tire rim part and a body part with a depression adjacent the junction of the parts; a wheel cover including an outer annular section and a crown section with said sections merging into and being secured together at a junction generally opposite said wheel depression; and circumferentially spaced resilient retaining portions connected to said cover and conforming generally to the dimension of the depression to nest therein and having an edge biasable against one of said parts to augment the gripping action of the retaining portion, said sections being secured together at circumferentially spaced intervals by the same retaining means which also connects the circumferentially spaced retaining portions to the cover, said retaining means comprising rivets.

10. In a wheel structure including a wheel having a tire rim part and a body part with a depression adjacent the junction of the parts; a wheel cover including an outer annular portion and a central portion with said portions merging into a junction generally opposite said wheel depression; and circumferentially spaced resilient retaining portions connected at one end to said cover in proximity to the junction of said cover portions, and a looped portion on the other end thereof nestingly engageable in the depression and terminating in a generally radially extending edge for biasing the looped portion into and out of engagement with the depression upon the application of an appropriate force, said circumferentially spaced resilient retaining portions maintaining the cover in cushioned engagement with the wheel and constituting the sole points of connection between the wheel and wheel cover.

11. In a wheel structure including a wheel having a tire rim part and a body part with a depression adjacent the junction of the parts; a wheel cover including an outer annular portion and a central portion with said portions merging into a junction generally opposite said wheel depression; and circumferentially spaced resilient retaining portions connected at one end to said cover in proximity to the junction of said cover portions including an intermediate looped portion terminating in a generally radially extending edge which is biasable against a wheel part to nestingly secure the looped portion in snap on-snap off cushioned engagement with the wheel.

12. In a wheel structure including a wheel having a tire rim part and a body part with the wheel having dished seat means thereon; a wheel cover having diverging cover portions including an outer annular cover portion and a radially inner cover portion with said portions junctioned together in close proximity to said wheel; and circumferentially spaced generally axially rearwardly extending spring clips disposed on the under side of said wheel cover and compressed in nested cooperation with said dished seat means to maintain said wheel cover on said wheel.

13. In a wheel structure including a wheel having a tire rim part and a body part with the wheel having seat means including radially spaced wall areas; a wheel cover having diverging cover portions including an outer annular cover portion and a radially inner cover portion with said portions junctioned together in close proximity to said wheel and extending axially into said annular seat; and circumferentially spaced generally axially rearwardly extending retaining extensions on said wheel cover and in cooperation with said seat means to maintain the wheel cover on said wheel, said extensions having a goose-neck configuration and being compressed between the spaced side wall areas.

14. In a wheel structure including a wheel having a tire rim part and a body part with the body part having seat means including radially spaced side wall areas; a wheel cover having diverging cover portions including an outer annular cover portion and a radially inner cover portion with said portions junctioned together in close proximity to said body part; and circumferentially spaced generally axially rearwardly extending retaining looped extensions on said wheel cover and disposed between the spaced side wall areas in detachable cooperation with said seat means with said looped extensions having terminal edges in edgewise cooperation with one of the side wall areas to maintain said wheel cover on said wheel.

References Cited in the file of this patent
UNITED STATES PATENTS

| | | |
|---|---|---|
| 2,368,245 | Lyon | Jan. 30, 1945 |
| 2,386,236 | Lyon | Oct. 9, 1945 |
| 2,629,635 | Lyon | Feb. 24, 1953 |